United States Patent [19]

Gray et al.

[11] Patent Number: 5,411,222
[45] Date of Patent: May 2, 1995

[54] SEAT BELT RETRACTOR WITH TENSION CONTROLLER

[75] Inventors: Mark F. Gray; Ken M. Forget, both of Ontario, Canada

[73] Assignee: TRW Vehicle Safety Systems Limited, Midland, Canada

[21] Appl. No.: 127,198

[22] Filed: Sep. 23, 1993

[51] Int. Cl.$^6$ .................. B60R 22/44; B65H 75/48
[52] U.S. Cl. ................................. 242/375.3
[58] Field of Search ............ 242/375.3; 280/806, 280/807; 297/475, 476, 477, 478

[56] References Cited

U.S. PATENT DOCUMENTS

| | | | |
|---|---|---|---|
| 3,997,126 | 12/1976 | Karlsson | 242/375.2 |
| 4,061,291 | 12/1977 | Cunningham | 242/375.3 |
| 4,097,003 | 6/1978 | Stouffer et al. | 242/375.3 |
| 4,099,683 | 7/1978 | Stouffer et al. | 242/375.3 |
| 4,640,472 | 2/1987 | Epple | 242/375.3 |
| 5,014,926 | 5/1991 | Rumpf et al. | |
| 5,054,162 | 10/1991 | Rogers | 242/375.3 |

*Primary Examiner*—John M. Jillions
*Attorney, Agent, or Firm*—Tarolli, Sundheim & Covell

[57] ABSTRACT

A seat belt retractor having a web tension controlling mechanism (36) includes a spool (32) for holding seat belt webbing (11), a frame (30) supporting the spool (32) for rotation in winding and unwinding directions, and a pinion (78) supported for rotation with the spool (32). A gear (104) is rotated by the pinion (78) and stresses a coil spring (102) upon rotation of the spool (32) in the unwinding direction. The gear (104) has a spiral array of gear teeth (156) which moves the gear axis (106) radially relative to the pinion axis (60) and which thus changes the effective pitch diameter (d) of the gear (104) upon rotation of the gear (104) by the pinion (78). The gear axis (106) is further directed to move pivotally about a pivot axis (132) when the gear axis (106) moves radially relative to the pinion axis (60).

6 Claims, 4 Drawing Sheets

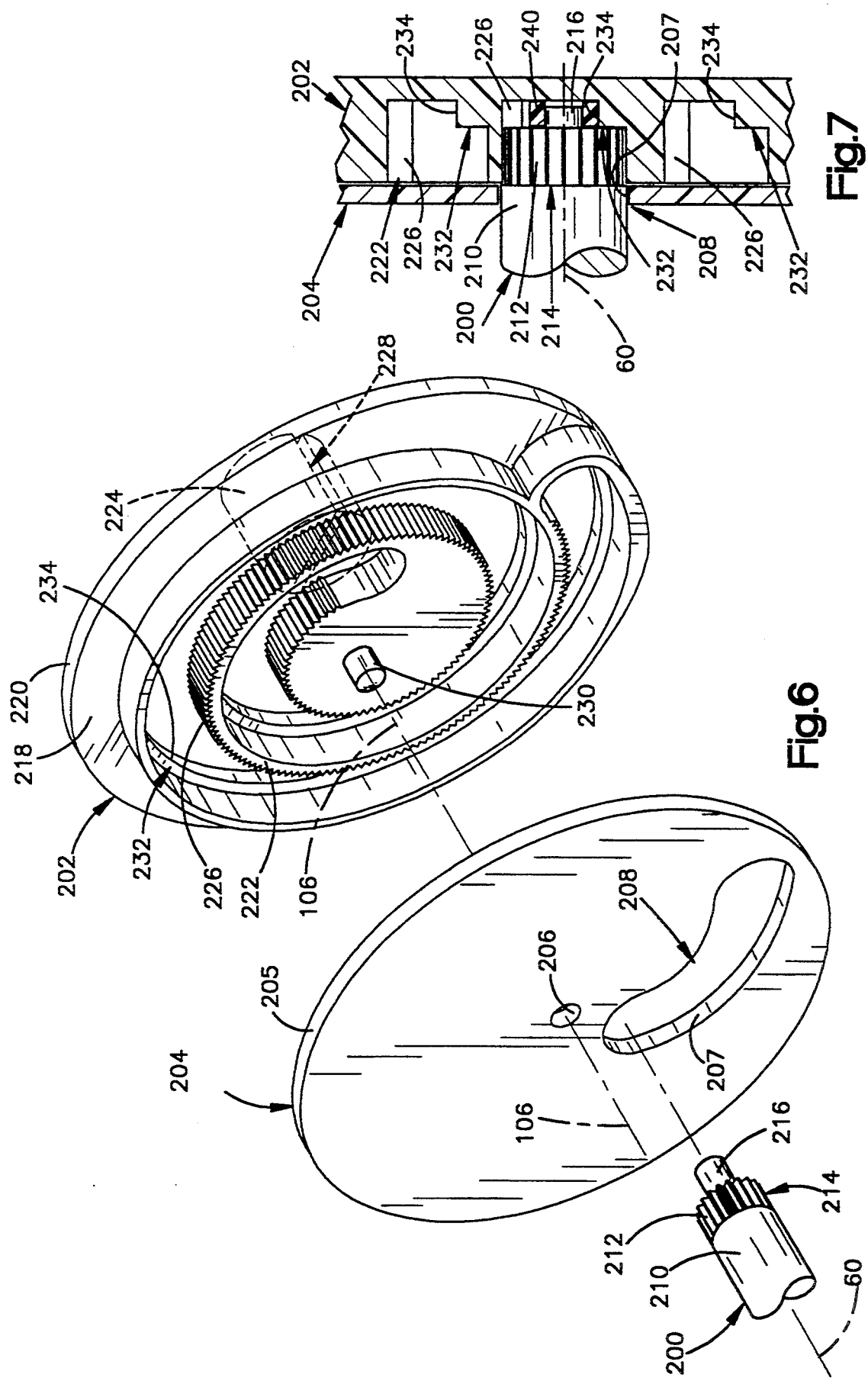

SEAT BELT RETRACTOR WITH TENSION CONTROLLER

FIELD OF THE INVENTION

The present invention relates to a retractor for seat belt webbing, and particularly relates to a retractor having an assembly for controlling the tension in seat belt webbing.

FIELD OF THE INVENTION

A seat belt retractor has a rotatable spool upon which seat belt webbing is wound. Typically, the seat belt webbing has a retracted, stored position in which it is wound on the spool, and has an extended position in which it extends from the spool around a seated vehicle occupant. The spool rotates in an unwinding direction as the seat belt webbing is withdrawn from the spool. A rewind spring in the retractor is stressed as the spool rotates in the unwinding direction. When the vehicle occupant releases the seat belt webbing from the extended position, the rewind spring rotates the spool in a winding direction to wind the seat belt webbing back onto the spool. The stress in the rewind spring increases progressively as the seat belt webbing is unwound from the spool, and decreases progressively as the seat belt webbing is wound back onto the spool. The torsional force of the rewind spring, which the vehicle occupant feels as tension in the seat belt webbing, thus changes as the amount of seat belt webbing which is wound on the spool changes.

SUMMARY OF THE INVENTION

In accordance with the present invention, a seat belt retractor comprises a spool, a pinion, a coil spring and a gear. The spool has a spool axis and a means for holding seat belt webbing on the spool. The pinion has a pinion axis. A frame supports the spool for rotation about the spool axis in a winding direction for winding the seat belt webbing onto the spool, and in an unwinding direction for unwinding the seat belt webbing from the spool. The frame further supports the pinion to rotate about the pinion axis upon rotation of the spool. The coil spring biases the spool to rotate in the winding direction.

The gear is rotated by the pinion upon rotation of the spool, and has a means for stressing the coil spring when the gear is rotated by the pinion upon rotation of the spool in the unwinding direction.

The gear further has a gear axis and gear teeth extending around the gear axis in a spiral array. The spiral array of gear teeth causes the gear axis to move radially relative to the pinion axis, and thus changes the effective pitch diameter of the gear, when the gear is rotated by the pinion.

In accordance with one feature of the present invention, the retractor includes a directing means for directing movement of the gear relative to the pinion. The directing means defines a pivot axis which is spaced radially from the pinion axis and the gear axis. The directing means directs movement of the gear such that the gear axis moves pivotally about the pivot axis when the gear axis moves radially relative to the pinion axis.

In accordance with another feature of the present invention, the retractor includes a means for maintaining the radial spacing between the inner and outer ends of the coil spring substantially constant throughout operation of the retractor. As a result, the stress in the coil spring is unaffected by changes in the radial spacing between the inner and outer ends of the coil spring which otherwise would occur upon radial movement of the gear axis relative to the pinion axis. This effect is achieved by moving both ends of the coil spring relative to the pinion axis when the gear axis moves radially relative to the pinion axis. In a preferred embodiment of the invention, both ends of the coil spring are moved pivotally about the pivot axis when the gear axis moves radially relative to the pinion axis.

A seat belt retractor constructed in accordance with the present invention controls the tension in the seat belt webbing so that the vehicle occupant feels a substantially constant amount of tension in the webbing as the amount of webbing which is wound on the spool changes. The spiral array of gear teeth causes the gear to move radially relative to the pinion axis so that the effective pitch diameter of the gear increases and decreases with the increasing and decreasing stress in the coil spring. The effective torsional force of the coil spring which resists rotation of the spool in the unwinding direction, and which the vehicle occupant feels as tension in the seat belt webbing, acts on the spool through the gear teeth on the spiral gear and the pinion. Because the effective pitch diameter of the spiral gear changes as the stress in the coil spring changes, the force which the vehicle occupant feels as tension in the seat belt webbing remains substantially unchanged as the seat belt webbing is wound onto the spool and/or unwound from the spool. Additionally, a greater degree of control over the stress in the coil spring is achieved by maintaining the radial spacing between the inner and outer ends of the coil spring substantially unchanged as the seat belt webbing is wound onto the spool and/or unwound from the spool.

BRIEF DESCRIPTION OF THE DRAWINGS

The foregoing and other features of the present invention will become apparent to those skilled in the art to which the present invention relates from reading the following description of the invention with reference to the accompanying drawings, in which:

FIG. 6 is an exploded perspective view of parts of a vehicle occupant restraint system which includes a second embodiment of the present invention; and FIG. 7 is a sectional view of parts shown in FIG. 6.

DESCRIPTION OF PREFERRED EMBODIMENTS

Figure 1:
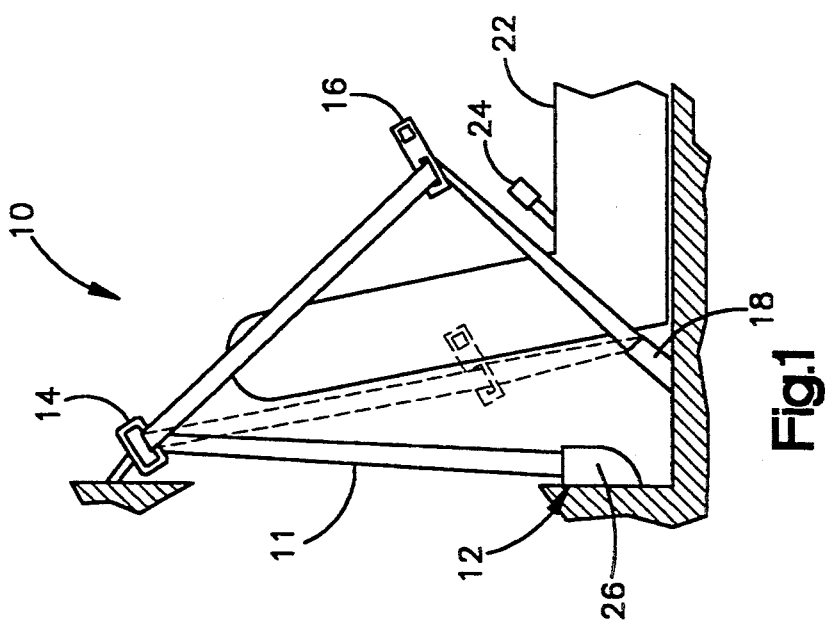
FIG. 1 is a schematic view of a vehicle occupant restraint system which includes a first embodiment of the present invention.

The present invention relates to a retractor for seat belt webbing in a vehicle occupant restraint system. A vehicle occupant restraint system 10 which includes a first embodiment of the present invention is shown in FIG. 1. The system 10 includes a length of seat belt webbing 11 and a retractor 12 in which the seat belt webbing 11 is wound. The system 10 further includes a D-ring 14, a locking tongue 16 and an anchor 18. The seat belt webbing 11 extends from the retractor 12 to the anchor 18 through the D-ring 14 and the tongue 16.

The seat belt webbing 11 is movable back and forth between a retracted position and an extended position upon winding and unwinding of the seat belt webbing 11 in the retractor 12. When the seat belt webbing 11 is in the retracted position, a portion of the seat belt webbing 11 is located on one side of an associated vehicle seat 22, as shown in dashed lines in FIG. 1. When the seat belt webbing 11 is in the extended position, as shown in solid lines in FIG. 1, it is unwound from the retractor 12 sufficiently to enable the tongue 16 to reach a buckle 24 at the other side of the seat 22.

Figure 2:
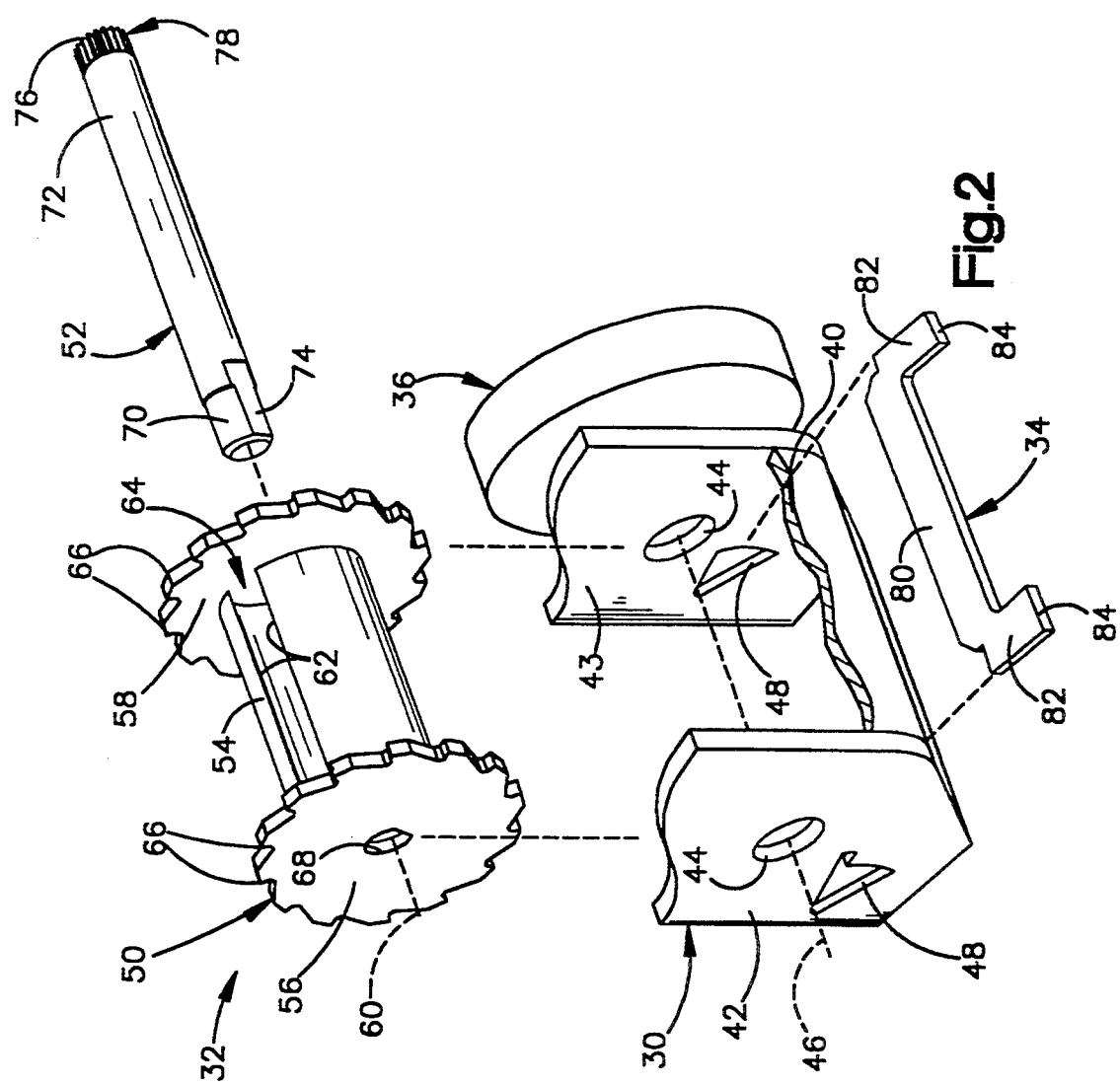
FIG. 2 is an exploded perspective view of parts of the system of FIG. 1, with certain parts shown schematically.

As shown in FIG. 1, the retractor 12 has a cover or housing 26. Other parts of the retractor 12 are shown in FIG. 2, including a frame 30, a spool 32, a lock bar 34 and a winding assembly 36.

The frame 30 of the retractor 12 has a base wall 40 and a pair of side walls 42 and 43. Each of the side walls 42 and 43 of the frame 30 has an inner edge surface 44 that defines a circular opening centered on an axis 46. Each of the side walls 42 and 43 also has an inner edge surface 48 that defines a somewhat triangular opening. The openings defined by the inner edge surfaces 48 are aligned with each other across the space between the side walls 42 and 43 of the frame 30.

The spool 32 includes a reel 50 and a shaft 52. The reel 50 includes a cylindrical sleeve 54 and a pair of ratchet wheels 56 and 58. The sleeve 54 has a longitudinal central axis 60 and a pair of longitudinal edge surfaces 62. The longitudinal edge surfaces 62 of the sleeve 54 are spaced from each other circumferentially, and thus define a slot 64 extending along the length of the sleeve 54. The ratchet wheels 56 and 58 are fixed coaxially to the opposite ends of the sleeve 54. Each of the ratchet wheels 56 and 58 has a circumferentially extending row of ratchet teeth 66. Each of the ratchet wheels 56 and 58 also has an inner edge surface which defines an opening centered on the axis 60. The inner edge surface 68 of the first ratchet wheel 56 is shown in FIG. 2, and defines a D-shaped opening. The inner edge surface of the second ratchet wheel 58 is not shown in FIG. 2. That inner edge surface defines a circular opening.

The shaft 52 has a first end portion 70 and a second end portion 72. The first end portion 70 of the shaft 52 has a D-shaped cross section which is defined in part by a flat surface 74 of the shaft 52. The second end portion 72 of the shaft 52 has gear teeth 76 defining a pinion 78 centered on the axis 60.

The shaft 52 has an assembled position extending coaxially through the reel 50, with the first and second end portions 70 and 72 of the shaft 52 extending outward through the central openings in the first and second ratchet wheels 56 and 58, respectively. The flat surface 74 of the shaft 52 then abuts the flat portion of the inner edge surface 68 of the first ratchet wheel 56 to block rotation of the reel 50 and the shaft 52 relative to each other about the axis 60. The shaft 52 retains an end portion of the seat belt webbing 11 (FIG. 1) which extends through the slot 64 in the sleeve 54 and is sewn in a loop around the shaft 52, or is otherwise suitably attached to the sleeve 54.

The first and second end portions 70 and 72 of the shaft 52 further extend coaxially outward through the circular openings in the side walls 42 and 43 of the frame 30. The shaft 52 thus supports the spool 32 for rotation in the frame 30 in opposite directions about the axis 60, which is fixed relative to the frame 30. When the spool 32 rotates in a winding direction (clockwise as viewed in FIG. 2), the seat belt webbing 11 is wound onto the spool 32 and is moved toward the retracted position. The spool 32 rotates oppositely in an unwinding direction (counterclockwise as viewed in FIG. 2) as the seat belt webbing 11 is unwound from the spool 32 and moved toward the extended position.

The lock bar 34 has central portion 80 and a pair of locking portions 82 extending from the central portion 80. Each of the locking portions 82 has an outer edge surface 84. When the retractor 12 is assembled, the lock bar 34 extends between the side walls 42 and 43 of the frame 30, with the locking portions 82 received in the generally triangular openings defined by the inner edge surfaces 48 of the side walls 42 and 43. The lock bar 34 is then movable pivotally into and out of a locking position in which the outer edge surfaces 84 are located in the paths of movement of the ratchet teeth 66 to block rotation of the spool 32 in the unwinding direction. The retractor 12 further includes a locking assembly (not shown) which moves the lock bar 34 into the locking position upon the occurrence of a vehicle collision. Such locking assemblies are known in the art.

The winding assembly 36 is mounted on the adjacent side wall 43 of the retractor frame 30, and is connected with the shaft 52 in the spool 32. The winding assembly 36 exerts a bias on the shaft 52 that resists rotation of the spool 32 in the unwinding direction as the seat belt webbing 11 is moved from the retracted position toward the extended position. The bias exerted by the winding assembly 36 rotates the spool 32 back in the winding direction to wind the seat belt webbing 11 back onto the spool 32 when the seat belt webbing 11 is released by the vehicle occupant for movement back from the extended position to the retracted position.

Figure 3:
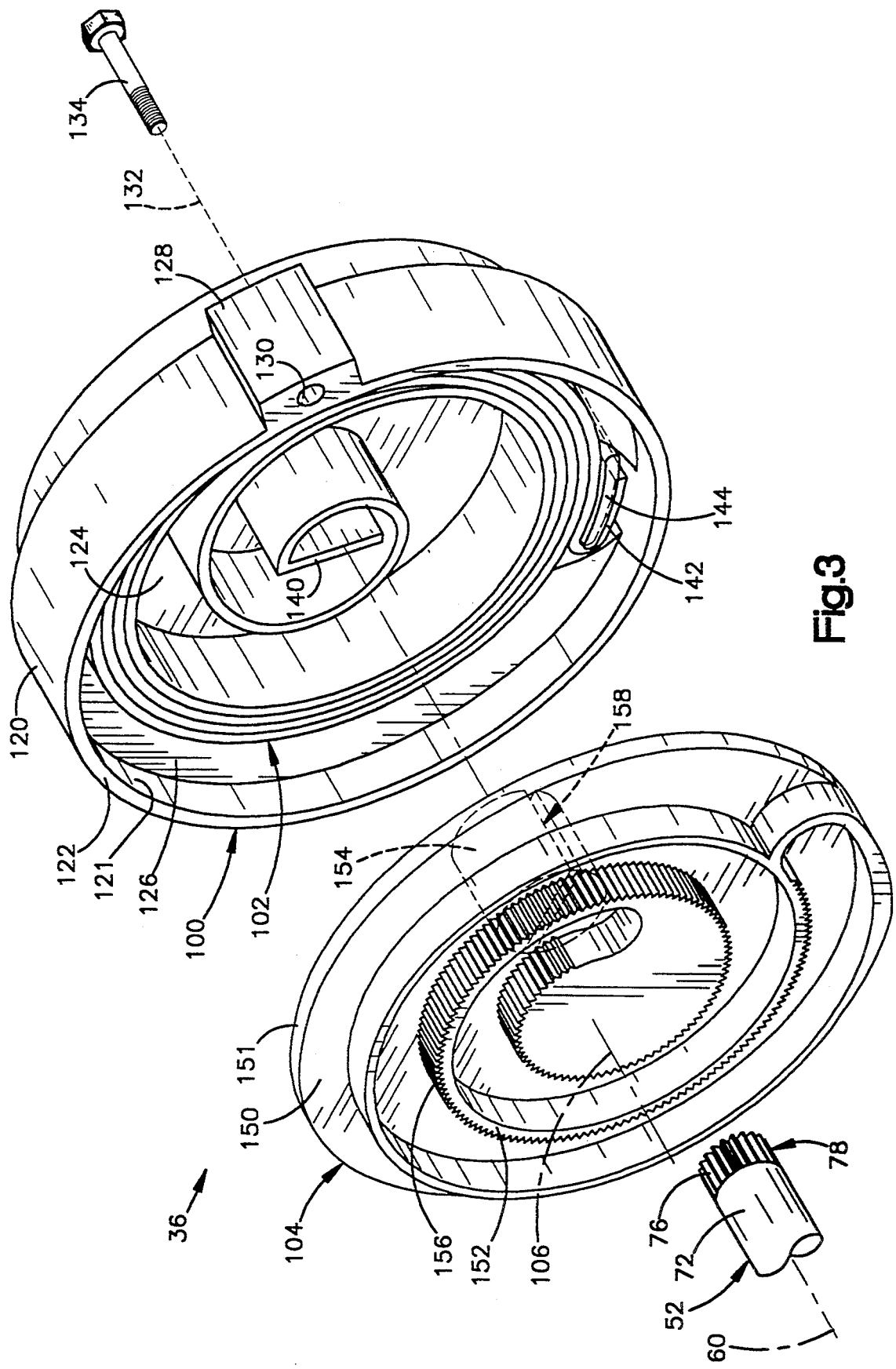
FIG. 3 is an exploded perspective view of parts shown in FIG. 2.
Figure 4:
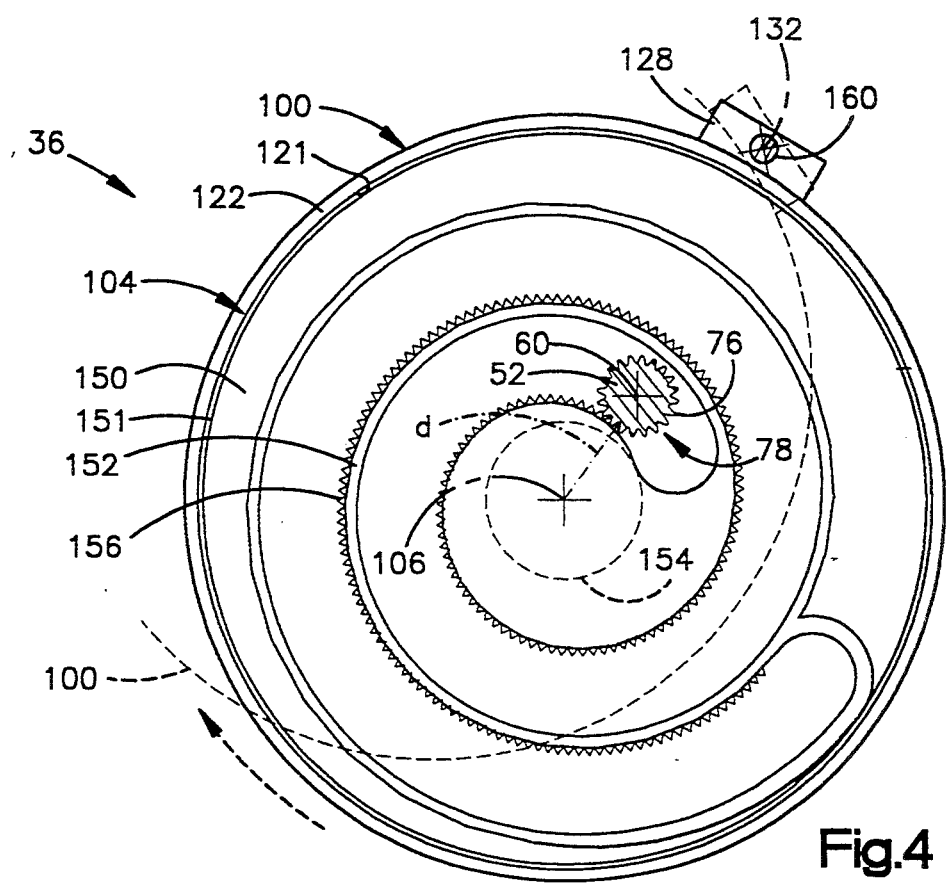
FIG. 4 is a side view of parts shown in FIG. 3.
Figure 5:
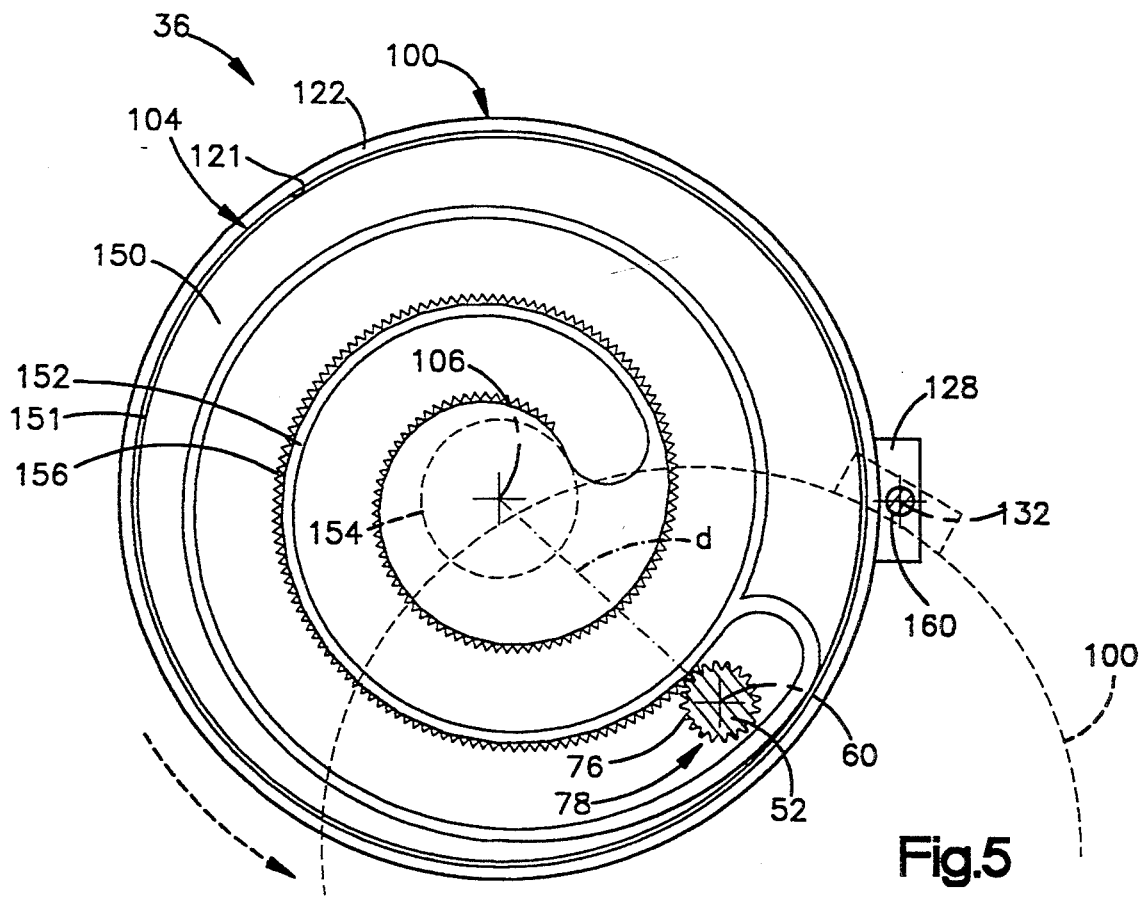
FIG. 5 is a view of the parts of FIG. 4 in different positions.

The winding assembly 36 is shown in greater detail in FIGS. 3–5. As shown in the exploded view of FIG. 3, the winding assembly 36 includes a housing 100, a coil spring 102, and a gear member 104. The housing 100, the coil spring 102 and the gear member 104 are located on an axis 106 of the winding assembly 36.

The housing 100 has a cylindrical outer wall 120. The outer wall 120 has a cylindrical inner surface 121 and an annular edge surface 122 defining an open end of the housing 100. The housing 100 also has a circular end wall 124 defining a closed end of the housing 100. An annular inner surface 126 of the housing 100 extends radially inward from the outer wall 120. A mounting block 128 projects radially outward from the outer wall 120 and has a cylindrical inner surface 130 centered on a pivot axis 132. The pivot axis 132 is parallel to the axes 106 and 60 of the winding assembly 36 and the pinion 78, respectively.

The housing 100 is supported on the side wall 43 by a fastener 134. The fastener 134 extends through the passage defined by the cylindrical inner surface 130 and supports the housing 100 for movement relative to the side wall 43 pivotally about the pivot axis 132. Moreover, the fastener 134 is fixed to the side wall 43, and thus constrains the housing 100 to move relative to the side wall 43 only pivotally about the pivot axis 132.

The coil spring 102 is received within the housing 100 in a compartment defined axially between the annular inner surface 126 and the end wall 124. The coil spring 102 has a radially inner end portion 140 and a radially outer end portion 142. The outer end portion 142 extends around a tab portion 144 of the housing 100, as shown in FIG. 3, and is thus fixed relative to the housing 100. The coil spring 102 is stressed upon rotation of the inner end portion 140 relative to the outer end portion 142 in the clockwise direction, as viewed in the drawings, and relaxes upon rotation of the inner end portion 140 relative to the outer end portion 142 back in the counterclockwise direction.

The gear member 104 has a circular base wall 150 centered on the axis 106. The base wall 150 has a cylindrical peripheral surface 151. The gear member 100 further includes a spiral gear 152 on one side of the base wall 150, and an arbor 154 on the other side of the base wall 150. The spiral gear 152 has gear teeth 156 extending around the axis 106 in a spiral array. The arbor 154 has a cylindrical shape centered on the axis 106, and is bisected by a slot 158 extending across and along the arbor 154.

The gear member 104 is received within the housing 100. The base wall 150 of the gear member 104 is received through the open end of the housing 100 and abuts the annular inner surface 126. The cylindrical peripheral surface 151 of the base wall 150 adjoins the cylindrical inner surface 121 of the housing 100. The arbor 154 on the gear member 104 extends axially inward from the base wall 150 toward the end wall 124 of the housing 100, and receives the radially inner end portion 140 of the coil spring 102 within the slot 158. The gear member 104 and the inner end portion 140 of the coil spring 102 are thus rotatable in the housing 100 about the axis 106 relative to both the housing 100 and the outer end portion 142 of the coil spring 102. The gear member 104 and the inner end portion 140 of the coil spring 102 are, however, fixed radially relative to the housing 100 and the outer end portion 142 of the coil spring 102 because the outer wall 120 of the housing 100 blocks movement of the base wall 150 of the gear member 104 radially relative to the housing 100. The gear teeth 156 on the spiral gear 152 mesh with the gear teeth 76 on the pinion 78, as shown in FIGS. 4 and 5.

When the seat belt webbing 11 is in the retracted position (FIG. 1), the winding assembly 36 is in the position shown in FIG. 4. The spiral gear 152 on the gear member 104, which meshes with the pinion 78 on the spool shaft 52, then has an effective pitch diameter (d) as shown in FIG. 4. The pitch diameter (d) corresponds to a moment arm along which torsional forces are transmitted between the coil spring 102 and the spool shaft 52.

As described above, the spool shaft 52 rotates about the axis 60 in the counterclockwise direction when a vehicle occupant withdraws the seat belt webbing 11 from the spool 32 upon movement of the seat belt webbing 11 from the retracted position toward the extended position. The pinion 78 on the spool shaft 52 then rotates the spiral gear 152 about the axis 106 in the clockwise direction as viewed in FIG. 4. The gear member 104 is thus rotated within the housing 100 to stress the coil spring 102 upon movement of the seat belt webbing 11 toward the extended position.

When the pinion 78 rotates the spiral gear 152 in the clockwise direction in the foregoing manner, the spiral array of gear teeth 156 on the spiral gear 152 causes the axis 106 of the gear member 104 to move radially away from the axis 60 of the pinion 78. Such radial movement of the gear member 104 relative to the pinion 78 is imparted to the housing 100 by the gear member 104 because the gear member 104 cannot move radially relative to the housing 100. However, the housing 100 is constrained to move only pivotally about the pivot axis 132. Therefore, the housing 100 directs the gear member 104 to move pivotally about the pivot axis 132 in the clockwise direction, as indicated by the arrow shown in FIG. 4, when the axis 106 of the gear member 104 moves radially away from the axis 60 of the pinion 78. The winding assembly 36 is thus moved pivotally relative to the spool shaft 52 from the position shown in FIG. 4 toward the position shown in FIG. 5 as the gear member 104 stresses the coil spring 102 upon rotation of the spool 32 in the unwinding direction. When the coil spring 102 relaxes and rotates the spool 32 back in the winding direction, the winding assembly 36 is moved pivotally back from the position shown in FIG. 5 toward the position shown in FIG. 4, as indicated by the arrow shown in FIG. 5.

When the winding assembly 36 is moved back and forth between the positions shown in FIGS. 4 and 5 in the foregoing manner, the pitch diameter (d) of the spiral gear 152 is increased as the stress in the coil spring 102 is increased, and is decreased as the stress in the coil spring 102 is decreased. Therefore, the portion of the torsional force of the coil spring 102 which is applied to resist rotation of the spool shaft 52 in the unwinding direction is decreased as the stress in the coil spring 102 is increased. Conversely, the portion of the torsional force of the coil spring 102 which is applied to rotate the spool shaft 52 back in the winding direction is increased as the stress in the coil spring 102 is decreased. The portion of the torsional force of the coil spring 102 which is applied to the spool shaft 52 thus changes inversely relative to the stress in the coil spring 102. The result is that the magnitude of the torsional force which is applied to the spool shaft 52 remains substantially the same for all conditions of the coil spring 102. That magnitude of torsional force, which the vehicle occupant feels as tension in the seat belt webbing 11, therefore remains substantially the same for all positions of the seat belt webbing 11.

Additionally, the radial spacing between the inner and outer end portions 140 and 142 of the coil spring 102 remains substantially unchanged throughout operation of the winding assembly 36. As a result, the stress in the coil spring 102 is unaffected by changes in the radial spacing between the inner and outer end portions 140 and 142 which otherwise would occur upon radial movement of the gear axis 106 relative to the pinion axis 60. This result is achieved because the outer end portion 142 of the coil spring 102 is fixed radially relative to the housing 100, the inner end portion 140 of the coil spring 102 is fixed radially relative to the gear member 104, and the gear member 104 is fixed radially relative to the housing 100. The inner and outer end portions 140 and 142 of the coil spring 102 are thus fixed radially relative to each other.

Parts of a vehicle occupant restraint system including a second embodiment of the invention are shown in FIGS. 6 and 7. In the second embodiment of the invention, a spool shaft 200 replaces the spool shaft 52 described above, and a gear member 202 replaces the gear member 104 described above. The second embodiment of the invention further includes a washer 204.

The washer 204 has a peripheral edge surface 205, a first inner edge surface 206, and a second inner edge surface 207. The first inner edge surface 206 defines a central aperture which extends through the washer 204 along the axis 106. The second inner edge surface 207 defines an arcuate slot 208. The slot 208 extends axially through the washer 204, and extends across the face of the washer 204 at a location between the first inner edge surface 206 and the peripheral edge surface 207.

Like the shaft 52 in the first embodiment of the invention, the shaft 200 is rotatable about the axis 60, and has an end portion 210 with gear teeth 212 defining a pinion 214. The shaft 200 further has a stub 216 extending coaxially from the pinion 214.

The gear member 202 has several parts that are the same as corresponding parts of the gear member 104 in the first embodiment of the invention. The gear member 202 thus has a circular base wall 218 with a cylindrical peripheral surface 220. The gear member 202 also has a spiral gear 222 on one side of the base wall 220, and an arbor 224 on the other side of the base wall 220. The spiral gear 222 has gear teeth 226 extending around the axis 106 in a spiral array. The arbor 224 has a cylindrical shape centered on the axis 106, and is bisected by a slot 228 extending across and along the arbor 224.

The gear member 202 further has a hub 230 and a spiral-shaped guide wall 232 centered on the axis 106. The guide wall 232 is circumferentially coextensive with the spiral array of gear teeth 226, and is spaced radially outward from the spiral array of gear teeth 226. An inner wall surface 234 of the guide wall 232 faces the gear teeth 226 and is uniformly spaced from the gear teeth 226 along its length.

The gear teeth 212 on the pinion 214 mesh with the gear teeth 226 on the spiral gear 222, as shown in FIG. 7. Additionally, a spacing ring 240 is supported on the stub 216 to rotate with the shaft 200. The spacing ring 240 extends radially from the stub 216 to the inner guide wall surface 234 on the gear member 202, and is held by the stub 216 in rolling engagement with the inner guide wall surface 234. The washer 204 is received between the gear member 202 and the adjoining side wall 43 (FIG. 2) of the retractor frame 30, with the hub 230 on the gear member extending through the central aperture defined by the first inner edge surface 206 of the washer 204. The end portion 210 of the shaft 200 extends through the slot 208 in the washer 204.

The pinion 214 on the shaft 200 and the spiral gear 222 on the gear member 202 rotate in meshing engagement with each other in the same manner as described above with reference to the shaft 52 and the gear member 104 in the first embodiment of the invention. The axis 106 of the gear member 202 is then moved radially toward and away from the axis 60 of the shaft 200. The arcuate shape of the slot 208 in the washer 204 accommodates the resulting relative movement between the shaft 200 and the washer 204.

When the axis 106 of the gear member is moved radially away from the axis 60 of the shaft 200, the pinion 214 exerts a force against the spiral gear 222 which urges the gear teeth 226 on the spiral gear 222 to move radially away from the gear teeth 212 on the pinion 214, i.e. upward as viewed in FIG. 7. The gear teeth 226 on the spiral gear 222 are thus urged to slip radially out of meshing engagement with the gear teeth 212 on the pinion 214. However, the spacing ring 240 extends radially from the stub 216 on the shaft 200 to the inner guide wall surface 234 on the gear member 202, and remains in rolling engagement with the inner guide wall surface 234 throughout rotation of the pinion 214 and the spiral gear 222. The spacing ring 240 blocks movement of the gear teeth 226 upward from the gear teeth 212, and thus holds the pinion 214 firmly in meshing engagement with the spiral gear 222. The second embodiment of the invention thus operates more smoothly and consistently.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a spool having a spool axis and means for holding seat belt webbing on said spool;
   a pinion having a pinion axis;
   frame means supporting said spool for rotation about said spool axis in winding and unwinding directions, said frame means further supporting said pinion to rotate about said pinion axis upon rotation of said spool;
   a coil spring biasing said spool to rotate in said winding direction;
   a gear which is rotated by said pinion upon rotation of said spool, said gear having means for stressing said coil spring when said gear is rotated by said pinion upon rotation of said spool in said unwinding direction;
   said gear further having a gear axis and means for causing said gear axis to move radially relative to said pinion axis and for thus changing the effective pitch diameter of said gear when said gear is rotated by said pinion, said means for causing said gear axis to move radially relative to said pinion axis including gear teeth extending around said gear axis in a spiral array; and
   directing means for directing movement of said gear relative to said pinion, said directing means defining a pivot axis spaced radially from said pinion axis and said gear axis, said directing means directing said gear axis to move pivotally about said pivot axis when said gear axis moves radially relative to said pinion axis;
   said directing means including a housing containing said gear, said directing means supporting said housing for movement relative to said frame under the influence of said gear when said gear axis moves radially relative to said pinion axis, said directing means constraining said housing to move relative to said frame only pivotally about said pivot axis, whereby said directing means causes said housing to direct said gear axis to move pivotally about said pivot axis when said gear axis moves radially relative to said pinion axis;
   said housing having a surface means for blocking movement of said gear radially relative to said housing;
   said coil spring having a radially inner end and a radially outer end, said radially inner end of said coil spring being connected to said gear to move pivotally about said pivot axis with said gear axis, said radially outer end of said coil spring being connected to said housing to move pivotally about said pivot axis with said housing.

2. Apparatus comprising:
   a spool having a spool axis and means for holding seat belt webbing on said spool;
   a pinion having a pinion axis;
   frame means supporting said spool for rotation about said spool axis in winding and unwinding directions, said frame means further supporting said pinion to rotate about said pinion axis upon rotation of said spool;

a coil spring biasing said spool to rotate in said winding direction;

a gear which is rotated by said pinion upon rotation of said spool, said gear having means for stressing said coil spring when said gear is rotated by said pinion upon rotation of said spool in said unwinding direction;

said gear further having a gear axis and means for causing said gear axis to move radially relative to said pinion axis and for thus changing the effective pitch diameter of said gear when said gear is rotated by said pinion, said means for causing said gear axis to move radially relative to said pinion axis including gear teeth extending around said gear axis in a spiral array; and directing means for directing movement of said gear relative to said pinion, said directing means defining a pivot axis spaced radially from said pinion axis and said gear axis, said directing means directing said gear axis to move pivotally about said pivot axis when said gear axis moves radially relative to said pinion axis;

said directing means including a housing containing said gear, said directing means supporting said housing for movement relative to said frame under the influence of said gear when said gear axis moves radially relative to said pinion axis, said directing means constraining said housing to move relative to said frame only pivotally about said pivot axis, whereby said directing means causes said housing to direct said gear axis to move pivotally about said pivot axis when said gear axis moves radially relative to said pinion axis.

3. Apparatus as defined in claim 2 wherein said gear is supported in said housing for rotation about said gear axis relative to said housing.

4. Apparatus as defined in claim 3 wherein said housing further contains said coil spring, said coil spring biasing said gear to rotate relative to said housing.

5. Apparatus as defined in claim 2 wherein said gear has an annular surface which is centered on said axis and which faces radially outward, said housing having a concentric inner surface facing radially inward toward said surface of said gear, said surface of said housing adjoining said surface of said gear and thereby supporting said gear for rotation about said gear axis relative to said housing.

6. Apparatus as defined in claim 5 wherein said surface of said gear is a radially outermost peripheral surface of said gear, said surface of said housing being a cylindrical inner surface of a cylindrical housing wall surrounding said gear.

* * * * *